(12) United States Patent
Bajikar

(10) Patent No.: US 7,191,281 B2
(45) Date of Patent: Mar. 13, 2007

(54) MOBILE COMPUTER SYSTEM HAVING A NAVIGATION MODE TO OPTIMIZE SYSTEM PERFORMANCE AND POWER MANAGEMENT FOR MOBILE APPLICATIONS

(75) Inventor: Sundeep M. Bajikar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 09/879,114

(22) Filed: Jun. 13, 2001

(65) Prior Publication Data

US 2003/0003943 A1 Jan. 2, 2003

(51) Int. Cl.
G06F 12/00 (2006.01)
G11B 21/02 (2006.01)

(52) U.S. Cl. ........................................ 711/112; 360/75
(58) Field of Classification Search ................ 711/112, 711/163, 111, 113, 4; 360/60, 75
See application file for complete search history.

(56) References Cited

U.S. PATENT DOCUMENTS

| | | | | |
|---|---|---|---|---|
| 6,065,094 | A * | 5/2000 | Akiyama | 711/112 |
| 6,115,200 | A * | 9/2000 | Allen et al. | 360/60 |
| 6,510,014 | B2 * | 1/2003 | Kikuta et al. | 360/60 |
| 6,754,021 | B2 * | 6/2004 | Kisaka et al. | 360/60 |
| 2001/0041587 | A1 * | 11/2001 | Gushiken | 455/556 |
| 2002/0027733 | A1 * | 3/2002 | Kikuta et al. | 360/60 |
| 2002/0060871 | A1 * | 5/2002 | Hamaguchi et al. | 360/48 |
| 2002/0114095 | A1 * | 8/2002 | Katahara et al. | 360/53 |
| 2002/0126408 | A1 * | 9/2002 | Okuyama et al. | 360/55 |
| 2002/0176430 | A1 * | 11/2002 | Sangha et al. | 370/412 |
| 2003/0191581 | A1 * | 10/2003 | Ukai et al. | 701/207 |

* cited by examiner

Primary Examiner—Matthew Kim
Assistant Examiner—Shane M. Thomas
(74) Attorney, Agent, or Firm—Cyndi Wheeler (57) ABSTRACT

A mobile computer system such as mobile PC operable between a normal, stationary mode and a Navigation mode for optimal system performance and power management for mobile applications. The mobile PC comprises a disk drive; a host processor equipped with an operating system (OS) which enables operation in a normal mode when the computer system is stationary and a Navigation mode when the computer system is mobile; a vibration sensor arranged to detect whether there is a presence of sustained or sporadic mechanical vibrations over a designated time duration, and to generate therefrom a vibration signal indicating the presence of sustained or sporadic mechanical vibrations; a position sensor arranged to detect whether there is a change in the position of the computer system at a fixed or variable velocity or acceleration, and to generate a position signal indicating the change in the position of the computer system; and a chipset equipped with a disk drive control logic arranged to control disk accesses to the disk drive, including controlling disk accesses to the disk drive in order to reduce damages to the disk drive in response to the vibration signal indicating the presence of sustained or sporadic mechanical vibrations or the position signal indicating the change in the position of the computer system.

19 Claims, 5 Drawing Sheets

FIG. 1

Prior Art

MOBILE COMPUTER SYSTEM HAVING A NAVIGATION MODE TO OPTIMIZE SYSTEM PERFORMANCE AND POWER MANAGEMENT FOR MOBILE APPLICATIONS

TECHNICAL FIELD

The present invention relates to an electronics system, and more particularly, relates to a mobile system such as a mobile PC having a mechanism for optimizing system performance and power management for mobile applications, while taking into account operating environments typical of such mobile applications and reducing the risk of damage to system components.

BACKGROUND

Computer systems typically incorporate some form of power saving and power management techniques to reduce power consumed by the computer systems, particularly portable or mobile personal computers (PCs) powered by a battery in order to maximize system performance and available battery usage time.

One example such power saving and power management techniques is provided in the Advanced Power Management (APM) specification jointly developed by Intel Corporation and Microsoft Corporation in February 1996. The APM algorithm is implemented by basic input-output system (BIOS) instructions stored in read-only memory (ROM) to provide various power saving functions, and manage the progress of power saving between full-on, standby, and sleep mode. The sleep mode is the level of least power consumption, which interrupts power supplies directed to microprocessor, display apparatus, hard disk drives, floppy disk drives, and other subsystems. The only power supplied is that which can restore the system to the full-on state. Further, the sleep mode may urge the system to enter into full power-off state, if the power management system adopts a suspend-to-disk utility to save the contents of the main memory and the system information to a reserved space on the hard disk.

A later power management specification, the Advanced Configuration and Power Interface (ACPI) specification, version 1.0B, jointly developed by Intel Corp., Microsoft Corp. and Toshiba Corp. in February 1999, is further implemented to enhance power management functionality and robustness, facilitate and accelerate industry-wide implementation of power management, and create a robust interface for configuring motherboard devices. The ACPI specification includes tables, BIOS, and hardware registers. ACPI tables are used to describe system information (e.g., supported power states, power sources, clock sources), features (e.g., available hardware devices), and methods for controlling those features (e.g., ACPI control methods). ACPI BIOS is that part of the computer system firmware that implements the ACPI specified interfaces for sleep, wake-up from sleeping, some restart operations, and provides permanent storage of ACPI table information. ACPI registers are used to store and pass event information between the hardware/firmware and an ACPI driver—an operating system (OS) level program that coordinates all transitions between active and inactive (sleeping) states.

Under the APM specification and the ACPI specification, computer systems such as mobile PCs may be configured to optimize system performance and save power during use, via various active and inactive states. Likewise, mobile PC mechanical structure (hardware) may be optimized for portability. However, system performance and power management features of the current APM and ACPI specifications require the mobile PCs to operate in a stationary environment, and make no distinction when the mobile PCs are used while being stationary or being transported from one location to another location. As a result, system performance and power management issues remain a challenge. This is because such a mobile PC is subject to very different operating environments and conditions when it is being transported than when it is stationary. For example, disk accesses may cause the disk drives to crash when extreme mechanical vibrations or impacts are present for short periods of time. In addition, there may be different requirements on the system performance and power management of the mobile PC if it is being used for certain types of applications while in motion.

Accordingly, there is a need for a mechanism to identify and differentiate between the stationary and mobile (dynamic) operating environments of the mobile PC and to optimize mobile PC system performance and power management for mobile applications, while taking into account operating environments typical of such mobile applications and reducing the risk of damage to system components.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of mobile devices and computer systems including mobile PCs, processors and chipsets, including chipsets which link together work stations, servers, peripherals and storage devices, and new chipsets having APM-compliant and ACPI-compliant control logic incorporated therein and new computer platforms which may become available as computer technology develops in the future.

Figure 1:
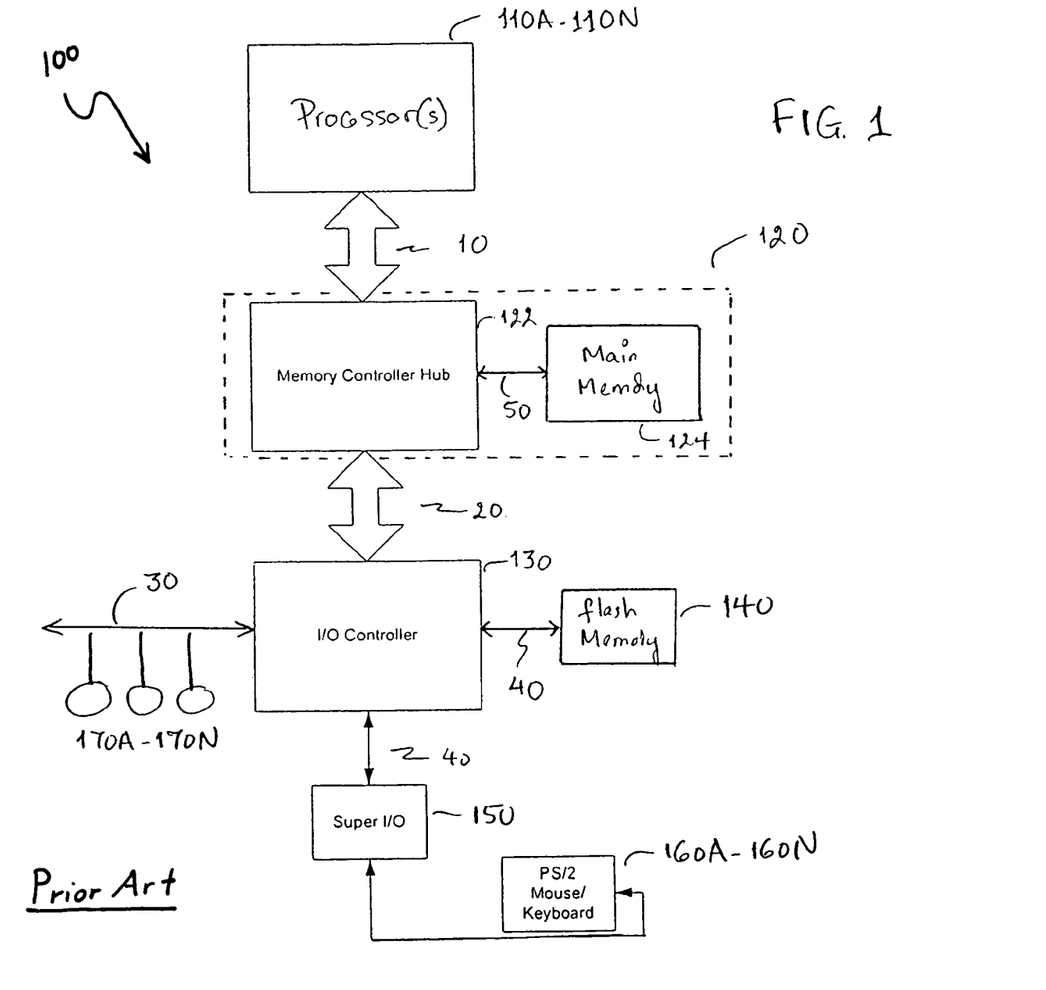
FIG. 1 illustrates an example computer system platform having a typical power management function incorporated therein.

Attention now is directed to the drawings and particularly to FIG. 1, an example computer system platform having an APM and ACPI system incorporated to handle various types of power management events is illustrated. As shown in FIG. 1, the computer system 100 (which can be a system commonly referred to as a mobile "PC") may comprise a processor subsystem 110, a memory subsystem 120, connected to the processor subsystem 110 by a front side bus 10, an I/O controller 130 connected to the memory subsystem 120 by a hub link 20 for providing an interface with peripheral buses such as a non-legacy Peripheral Component Interconnect (PCI) bus 30, a flash memory 140, and a super I/O 150 connected thereto by a low pin count (LPC) bus 40 for providing an interface with a plurality of I/O devices 160A–160N.

The processor subsystem 110 may include one or more processors or central processing units (CPUs) 110A–110N such as Intel® i386, i486, Celeron™ or Pentium® processors.

The memory subsystem 120 may include a memory controller hub (MCH) 122 connected to the host processors 110A–110N by a front side bus 10 (i.e., host bus or processor bus) and at least one memory element 124 connected to the MCH 122 by a memory bus 50. The memory element 124 may preferably be a dynamic random-access-memory (DRAM), but may be substituted for read-only-memory (ROM), video random-access-memory (VRAM) and the like. The memory element 124 stores information and instructions such as an operating system (OS) such as Windows™ 95/98 and Windows™ 2000 for use by the host processors 110A–110N. The graphics (not shown) may be connected to the main controller hub (MCH) 122 of the memory subsystem 120 by a graphics bus (not shown), and may include, for example, a graphics controller, a local memory and a display device (e.g., cathode ray tube, liquid crystal display, flat panel display, etc.).

The 10 controller 130 may operate as an interface between the front side bus 10 and peripheral buses such as a non-legacy Peripheral Component Interconnect (PCI) bus 30 and a low pin bus 40. The PCI bus 30 may be a high performance 32 or 64 bit synchronous bus with automatic configurability and multiplexed address, control and data lines as described in the "*PCI Local Bus Specification, Revision* 2.1" set forth by the PCI Special Interest Group (SIG) on Jun. 1, 1995, or the latest version "*PCI Local Bus Specification, Revision* 2.2" published on Dec. 18, 1998 for add-on arrangements (e.g., expansion cards) with new video, networking, or disk memory storage capabilities. Other types of bus architecture such as an Industry Standard Architecture (ISA) bus and Extended Industry Standard Architecture (EISA) bus may also be utilized.

The flash memory (e.g., EPROM) 140 may be connected to the ICH 130 via a low pin count (LDC) bus 40. Such a flash memory 140 may also store an operating system (OS), a set of system basic input/output start up (BIOS) instructions at startup of the computer system 100 and ACPI instructions implemented to provide various power saving functions, and manage the progress of power saving between full-on, standby, and sleep mode. Alternatively, the operating system (OS), the BIOS instructions and the ACPI instructions may be stored in the memory 124 of the memory subsystem 120.

The super I/O 150 may provide an interface with another group of I/O devices 160A–160N, including, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices.

One or more PCI 2.1/2.2 compliant peripheral devices 170A–170N, such as a modem and a local area network (LAN) device may be connected to the PCI bus 30 for enabling access to a public switched telephone network (PSTN) or other networks such as a local area network (LAN) for example. In addition, a PCI device and a universal serial bus (USB) device may also be utilized in compliance with the "*PCI Local Bus Specification, Revisions* 2.1 *and* 2.2" and the "*Universal Serial Bus Specification, Revision* 2.0" published on Apr. 27, 2000 for add-on arrangements with new video, networking, disk memory storage capabilities and communication peripherals such as telephone/fax/modem adapters, answering machines, scanners, personal digital assistants (PDAs) etc.

The memory controller 120 and the graphics controller (not shown) may be integrated as a single graphics and memory controller hub (GMCH). Such a GMCH may also be implemented as part of a host chipset along with an I/O controller 130 as described with reference to FIG. 2 hereinbelow, for example, in Intel® 810, Intel® 870 and 8XX series chipsets.

If the GMCH is implemented as part of a host chipset, then the I/O controller 130 may be utilized to provide an interface to a variety of I/O devices and the like, such as: a Peripheral Component Interconnect (PCI) bus (PCI Local Bus Specification Revision 2.2) which may have one or more I/O devices connected to PCI slots, an Industry Standard Architecture (ISA) bus option, and a local area network (LAN) option; a super I/O chip (not shown) for providing an interface with another group of I/O devices such as a mouse, keyboard and other peripheral devices; an audio coder/ decoder (Codec) and modem Codec; a plurality of Universal Serial Bus (USB) ports (USB Specification, Revision 1.0); and a plurality of Ultra/66 AT Attachment (ATA) 2 ports (X3T9.2 948D specification; commonly also known as Integrated Drive Electronics (IDE) ports) for receiving one or more magnetic hard disk drives or other I/O devices.

The USB ports and IDE ports may be used to provide an interface to a hard disk drive (HDD) and compact disk read-only-memory (CD-ROM). I/O devices and a flash memory (e.g., EPROM) may also be connected to the I/O controller 130 of the host chipset 200 for extensive I/O supports and additional functionality. Those I/O devices may include, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers and scanners. The flash memory may also be connected to the ICH of the host chipset via a low pin count (LDC) bus. The flash memory may store a set of system basic input/output start up (BIOS) routines at startup of the computer system 100.

As described with reference to FIG. 1, such a computer system platform utilizes power management features of current APM and ACPI specifications which require the mobile PC to operate in a stationary environment. No distinction is provided nor consideration made, when the mobile PC is used while being stationary or being transported from one location to another location. As a result, system performance and power management issues remain a challenge particularly, when the mobile PC is stationary and when the mobile PC is being transported which may be subject to very different operating environments and conditions. For example, disk accesses (reads or writes) may cause the disk drives to crash when extreme mechanical vibrations or impacts are present for short periods of time. In addition, there may be different requirements on the system performance and power management of the mobile PC if it is being used for certain types of applications while in motion.

Figure 2:
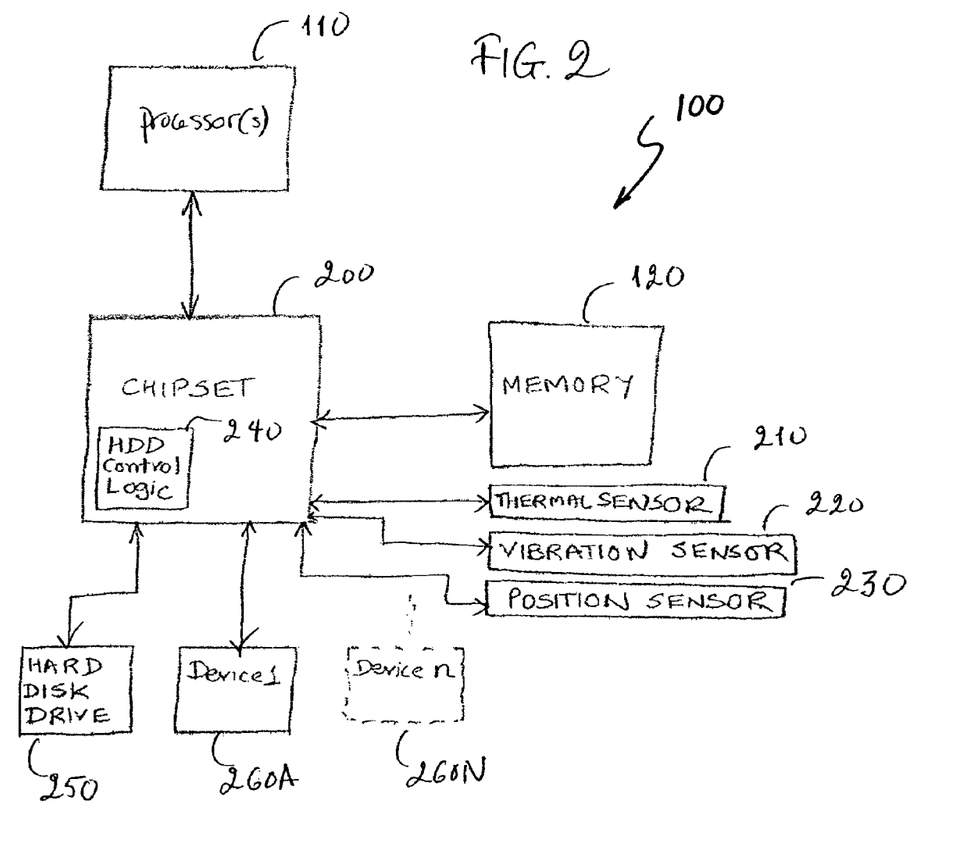
FIG. 2 illustrates an example computer system platform of a mobile PC having a host chipset and a mechanism incorporated therein for identifying between a normal (stationary) mode and a mobile (navigation) mode to optimize mobile PC system performance and power management for mobile applications according to an embodiment of the present invention.

Turning now to FIG. 2, an example computer system platform of a mobile PC 100 having a host chipset 200 and a mechanism incorporated therein for identifying between a normal (stationary) mode and a mobile (Navigation) mode in order to optimize mobile PC system performance and power management for mobile applications according to an embodiment of the present invention is illustrated. The purpose of the "Navigation" mode is to identify and differentiate between the stationary and the mobile operating modes of the mobile PC 100. Such a "Navigation" mode provides a mechanism to optimize system performance and power management for mobile applications, while taking into account certain operating environments typical of such mobile applications and reducing the risk of damage to system components.

As shown in FIG. 2, hardware such as a thermal sensor 210, a vibration sensor 220 and a position sensor 230 may be incorporated to the host chipset 200 utilized to trigger into and exit from the Navigation mode. The thermal sensor 210 is utilized to sense the temperature of the mobile PC 100 and to initiate power saving in accordance with the ACPI specification when the temperature of the mobile PC 100 exceeds a predetermined temperature. The vibration sensor 220 is utilized to sense whether there is a presence of sustained or sporadic mechanical vibrations of varying magnitude over a certain threshold duration of time, and/or there is a chance of mechanical shocks which are characteristics of a mobile (dynamic) operating environment. When there is a presence of sustained or sporadic mechanical vibrations or there is a chance of mechanical shocks, the vibration sensor 220 may trigger entry into a Navigation (mobile) mode from a normal (stationary) mode and exit from the Navigation (mobile) mode back to the normal (stationary) mode. Likewise, the position sensor 230 is utilized to sense whether there is a change in the position of the mobile PC 100 at a fixed or variable rate (velocity) and/or at a fixed or variable acceleration in order to trigger entry into and exit therefrom the Navigation (mobile) mode.

Both the vibration sensor 220 and the position sensor 230 may be integrated into the chipset 200, or alternatively, may be attached to the chipset 200 as separate components used to trigger entry into a Navigation (mobile) mode from a normal (stationary) mode and exit therefrom.

The position sensor 230 may be implemented using, for example, short-range wireless communications devices in compliance with Bluetooth™ standards (BT) or IEEE 802.11b standards, or long-range wireless communication devices in compliance with Global Positioning System (GPS) standards.

Bluetooth™ standard (BT) is a protocol of a short-range (typically 10 meter but can be extended to more than 100 meters) frequency-hopping radio link between devices. A mobile PC 100 using a Bluetooth™ standard may eliminate the need for wires and cables while allowing for data and voice communication interaction between the mobile PC 100 and another device using the Bluetooth™ standard. Bluetooth™ technology supports point to multiple point connections so that up to seven devices can be set to communicate with an access point (AP). This is called a piconet and several of these piconets can be established and linked together to form scatternets to allow communication among different configurations. In one embodiment, several transceivers using the Bluetooth™ standard can determine position information by communicating with several transmitters also using the Bluetooth™ standard and with each other.

In an alternative short-range wireless communication embodiment, the IEEE 802.11b standard is utilized as a wireless local area network (LAN) developed by the Institute of Electrical and Electronic Engineering (IEEE) Institute in order to specify an "over the air" interface between a wireless client and a base station or access point (AP), as well as among wireless clients. A wireless LAN (WLAN) is a data transmission system designed to provide location-independent network access between computing devices by using radio waves rather than a cable infrastructure. Transceivers may use the IEEE 802.11b standard to communicate with transmitters using the IEEE 802.11b standard and with each other to determine position relative to the transmitters.

The following table lists examples of mechanisms that may be used to trigger entry into and exit from the Navigation mode. However, the following assumptions are made. First, in all places where Bluetooth™ (BT) or Global Position System (GPS) are referenced, it is assumed that these are an integral part of the mobile PC 100. Second, during entry and exit from the Navigation mode, it is assumed that the mobile PC 100 has not been powered off, or otherwise put into a deep sleep state in accordance with the ACPI specification.

| Entry into Navigation Mode | Exit from Navigation Mode |
| --- | --- |
| Disconnection from a BT/other AP | Loss of GPS satellite lock or no change in GPS position |
| GPS satellite lock & motion detection from changing GPS position | Connection with a (known) static AP |

Note:
BT = Bluetooth, AP = Access Point, GPS = Global Positioning System

Figure 3:
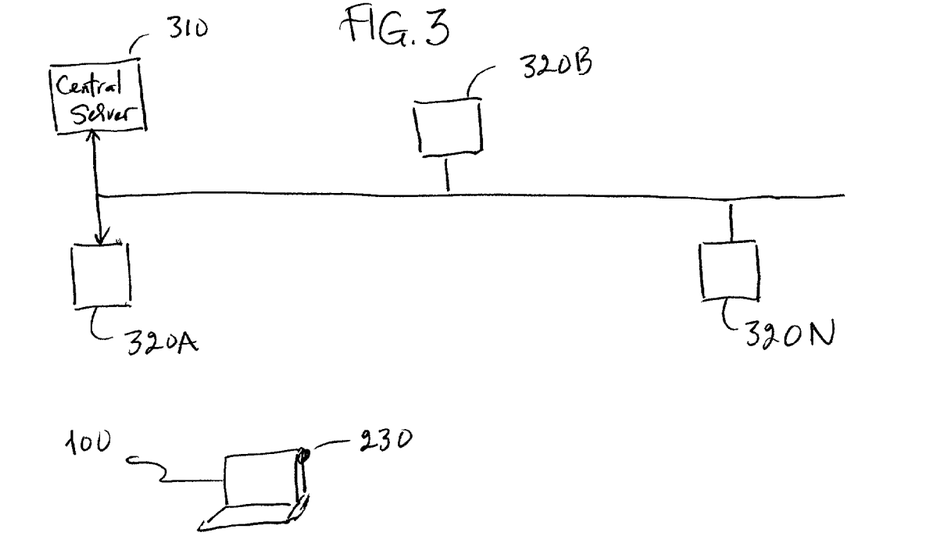
FIG. 3 illustrates an example implementation of a position sensor of the mobile PC using a Bluetooth™ architecture according to an embodiment of the present invention.

For example, FIG. 3 illustrates an example position sensor of the mobile PC using a Bluetooth™ architecture according to an embodiment of the present invention. In this example, the position sensor 230 of the mobile PC 100 may be equipped with Bluetooth™. As shown in FIG. 3, the Bluetooth™ network comprises a centralized network server 310 and a number of BT Access Points (BTAPs) 320A–320N each strategically installed at a pre-survey (known) location where the mobile PC 100 is in use. When the mobile PC 100 is disconnected from the BTAPs 320A–320N, then the mobile PC 100 may be triggered entry into the Navigation mode. Likewise, when the mobile PC 100 re-establishes connection with any one of the BTAPs 320A–320N, the mobile PC 100 may be triggered exit from the Navigation mode and return to the normal (stationary) mode. Likewise, when the mobile PC 100 re-establishes connection with any one of the BTAPs 320A–320N, the mobile PC 100 may be triggered exit from the Navigation mode and return to the normal (stationary) mode.

Figure 4:
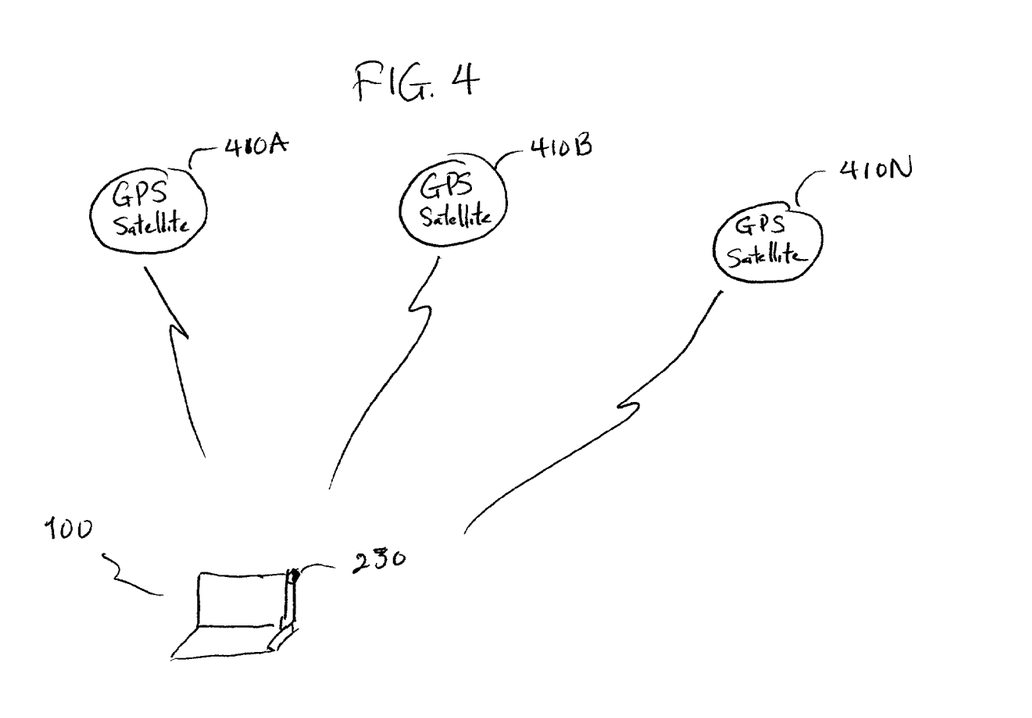
FIG. 4 illustrates an example implementation of a position sensor of the mobile PC using a Global Position System (GPS) architecture according to an embodiment of the present invention.

FIG. 4 illustrates an example implementation of a position sensor of the mobile PC using a Global Position System (GPS) architecture according to an embodiment of the present invention. In this example, the position sensor 230 of the mobile PC 100 may be equipped with a GPS system. As shown in FIG. 4, the GPS network comprises a plurality of GPS satellites 410A–410N each strategically located at a pre-survey (known) location where the mobile PC 100 is in use. When there is a GPS satellite lock or a change in GPS position, the mobile PC 100 may be triggered entry into the Navigation mode. Likewise, when there is a loss of GPS satellite lock or no change in GPS position, the mobile PC 100 may be triggered exit from the Navigation mode and return to the normal (stationary) mode.

Figure 5:
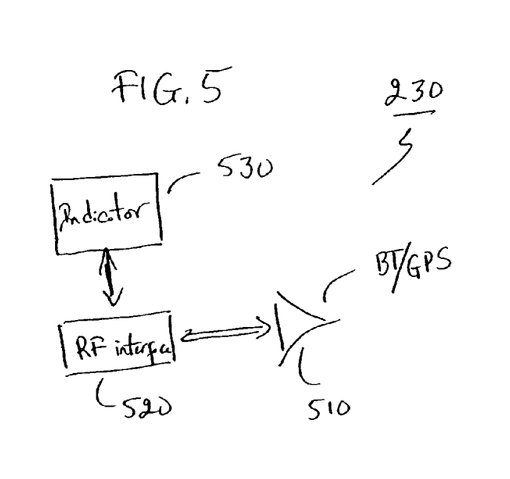
FIG. 5 illustrates an example implementation of a position sensor of the mobile PC according to an embodiment of the present invention.

FIG. 5 illustrates an example implementation of a position sensor 230 of the mobile PC according to an embodiment of the present invention. As shown in FIG. 5, the position sensor 230 may comprise a BT/GPS radio transceiver 510, a RF interface 520, and an indicator 530. The BT/GPS radio transceiver 510 may be arranged to establish communication with either the BTAPs 320A–320N as shown in FIG. 3 or the GPS satellites 410A–410N in order to determine whether there is a change in the position of the mobile PC 100 at a fixed or variable rate (velocity) and/or at a fixed or variable acceleration. The indicator 530 may be arranged to generate an indication of the change in the position of the mobile PC 100 at a fixed or variable rate (velocity) and/or at a fixed or variable acceleration.

In addition, hardware such as the hard disk drive "HDD" control logic 240 may also be integrated within the host chipset 200 to respond to the thermal sensor 210, the vibration sensor 220 and the position sensor 230 in order to control operation of the hard disk drive "HDD" 250 and other storage devices 260A–260N and enhance mPC system optimizations in the Navigation mode. For example: hard disk accesses (reads or writes) to hard disk drive "HDD" 250 and other storage devices 260A–260N can be minimized by optimizing application programs to exploit the system memory capacity. Disk accesses can be reduced in duration by doing only short bursts in the Navigation mode. This can reduce the probability of a disk access while the mobile PC 100 is experiencing a mechanical shock, hence reducing the risk of damage to the hard disk drive "HDD" 250. In addition, disk accesses (reads or writes) can be completely blocked under conditions where extreme mechanical vibrations are present for short periods of time. Vibrations can be detected from the vibration sensor 220, or through the use of the position sensor 230.

The number of required disk accesses (reads or writes) to hard disk drive "HDD" 250 and other storage devices 260A–260N can also be reduced by emphasizing on main memory databases and execution of mobile applications (e.g. real-time driving directions based on positioning). Performance improvement of the mobile applications can also reduce the number of required disk accesses and benefit the power consumption while running these mobile applications.

The HDD control logic 240 may be incorporated within a specifically designed application specific integrated circuit (ASIC) and may access the hard disk drive "HDD" 250 and other storage devices 260A–260N via a HDD interface which is typically provided to support one or more of the following types of data transfers in either direction (chipset 200 to hard disk drive "HDD" 250, hard disk drive "HDD" 250 to chipset 200): (1) programmed I/O (PIO): The system processor(s) 110 is in control of the data transfer; (2) 8237 style Bus Master IDE (DMA): ISA style DMA protocol, 16 MB/sec; (3) Ultra33, Ultra66 or Ultra100 DMA: Both the host chipset 200 as well as the HDD 250 can throttle data, and transfer rates up to 111 MB/s reads and 88 MB/s writes may be possible. In the case of programmed I/O, a software-based throttling of the hard disk accesses may be implemented since the processor(s) 110 is in control of the data transfers. In the 8237 style DMA (Bus Master IDE) however, additional protocol modifications may be necessary in order to support explicit hard disk throttling as desired under the Navigation mode.

The HDD control logic 240 contains registers for the following purposes: (1) set timing (delay, burst size) to control frequency of read/write cycles; (2) set burst size to control how much data is transferred during each read/write cycle; and (3) completely block hard disk access (read or write) if the chipset-attached vibration sensor 220 indicates the presence of strong sustained vibrations. As a result, disk accesses (reads and writes) can be reduced in duration by short bursts in the Navigation mode. In addition, such disk accesses (reads and writes) can also be completely blocked under conditions where extreme mechanical vibrations are present for short periods of time.

Figure 6:
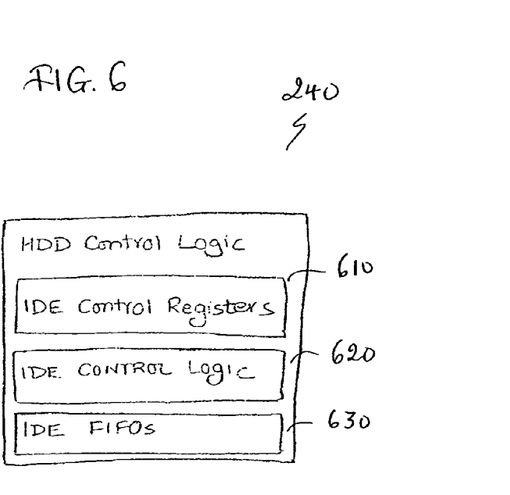
FIG. 6 illustrates an example hard disk drive (HDD) control logic according to an embodiment of the present invention.

More specifically, the HDD control logic 240 as shown in FIG. 6, may include IDE control registers 610, an IDE control logic 620 and IDE first-in/first-outs (FIFOs) 630. The IDE control register(s) 610 are used to set the parameters for individual transfers (read or write) based on an indication signal from the vibration sensor 220 (e.g., magnitude of the vibration) or the position sensor 230 regardless whether the mobile PC 100 is operating in a normal (stationary) mode or a mobile (Navigation) mode. Such parameters may include "burst size", "transfer count", "base memory address", etc. For example, if the mobile PC 100 is operating in a normal (stationary) mode, then the parameters such as "burst size", "transfer count", and "base memory address" may be set in such a way consistent with the normal (stationary) mode. Likewise, if the mobile PC 100 is operating in a mobile (Navigation) mode, then the parameters such as "burst size", "transfer count", and "base memory address" may be set in such a way consistent with the Navigation mode.

The IDE control register(s) 610 are typically addressable as memory mapped addresses. The IDE control logic 620 may be utilized to set up the FIFO threshold level of the IDE FIFO 630 and the delay time, via the IDE control register(s) 610 in order to write/read data to/from the HDD 250. The FIFO threshold level of the IDE FIFOs 630 may be fixed or programmable. However, for every access to the HDD 250, data may not be written to the HDD 250 or read from the HDD 250 until the delay time set is completed and the programmable FIFO threshold is reached.

The IDE FIFOs 630 provide the line buffering during an actual data transfer on the IDE interface (not shown) to the HDD 250. A common size for the IDE FIFO 630 may be 16 DWORDs (64 bytes). The 16 DWORDs may be broken down into a "Ping" and a "Pong" FIFO, each 8 DWORDS deep. Together, the IDE FIFOs 630 provide the data buffering required to maintain a continuous high rate of data transfers between the chipset 200 and the hard disk drive (HDD) 250 and other storage devices 260A–260N.

Figure 7:
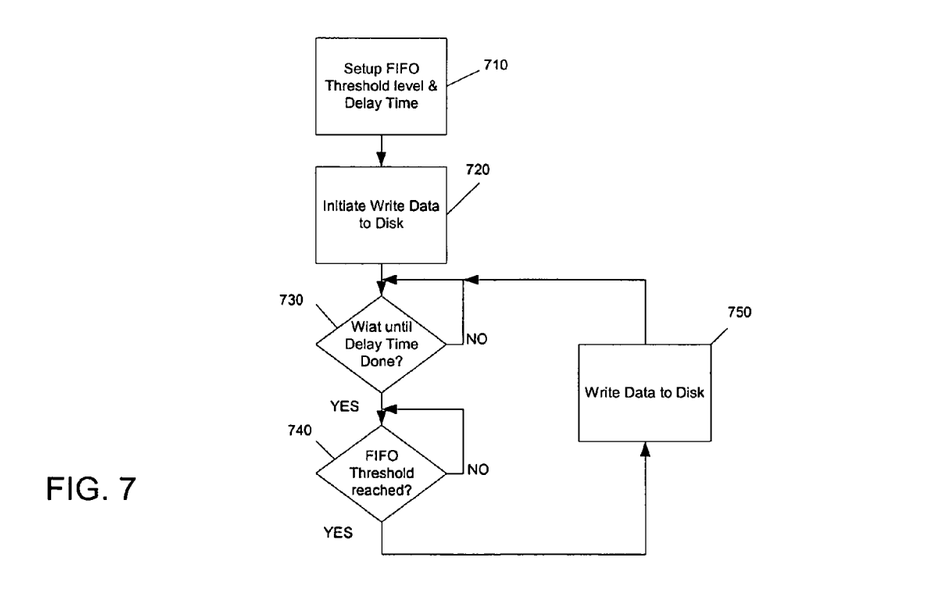
FIG. 7 illustrates a flowchart of an example hard disk drive (HDD) control logic according to another embodiment of the present invention.

FIG. 7 illustrates a flowchart of an example hard disk drive (HDD) control logic 250 shown in FIG. 6. When an indication signal is received from the vibration sensor 220

(e.g., magnitude of the vibration) or the position sensor 230, the IDE control logic 620 is utilized to set up the FIFO threshold level of the IDE FIFO 330 and the delay time, via the IDE control register(s) 610 in order to write/read data to/from the HDD 250 at block 710. For example, if the magnitude of the vibration from the vibration sensor 220 is "high" then the programmable FIFO threshold level may be "high" and the delay time set may be "long". Likewise, if the magnitude of the vibration from the vibration sensor 220 is "low" then the programmable FIFO threshold level may be "low" and the delay time set may be "short".

Next, the IDE control logic 620 initiates writing data to the HDD 250 at block 720. Then the IDE control logic 620 waits until the delay time set is completed at block 730 and the programmable FIFO threshold level is reached at block 740 before data can be written onto the HDD 250 at block 750. In other words, the data may not be written to the HDD 250 until the delay time set is completed at block 730 and the programmable FIFO threshold is reached at block 740. This way disk accesses (reads or writes) to the HDD 250 and other storage devices 260A–260N can be minimized based on the programmable FIFO threshold level and delay time. If the mobile PC 100 is operating in a normal (stationary) mode, disk accesses may be normal. However if the mobile PC 100 is operating in a mobile (navigation) mode, the disk accesses may be reduced in duration by doing only short bursts in order to reduce the risk of damage to the hard disk drive "HDD" 250 and other storage devices 260A–260N. In addition, if mechanical vibrations are present over a certain threshold duration of time, such disk accesses (reads or writes) can be completely blocked if the FIFO threshold level and the delay time are set as "unreachable" or deactivated.

Figure 8:
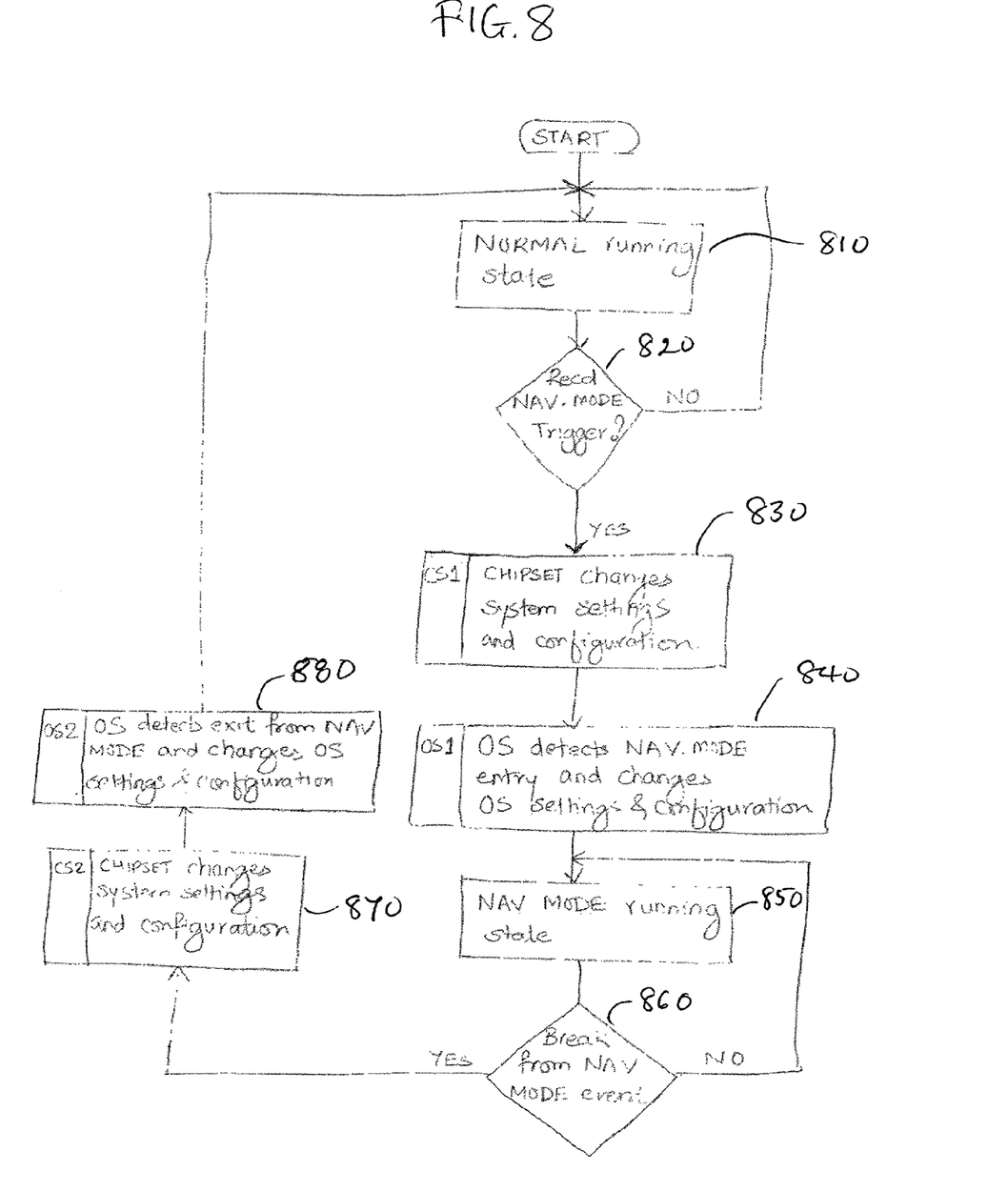
FIG. 8 illustrates a flowchart of an example computer system operation between the normal (stationary) mode and the mobile (navigation) mode according to an embodiment of the present invention.

FIG. 8 illustrates a flowchart of an example computer system (mobile PC) operation between the normal (stationary) mode and the mobile (navigation) mode according to an embodiment of the present invention. As shown in FIG. 8, the mobile PC 100 operates in a normal (stationary) mode at block 810. As such, system parameters such as "burst size", "transfer count", and "base memory address" are set for operation in a normal (stationary) mode.

When a Navigation mode is triggered based on an occurrence of any one of the listed characteristics as described, including the change in the position of the mobile PC 100 as a fixed or variable rate (velocity) and/or at a fixed or variable acceleration from the position sensor 230, the presence of sustained or sporadic mechanical vibrations of varying magnitude over a certain threshold duration of time, and/or the chance of mechanical shocks from the vibration sensor 220 at block 820, the HDD control logic 240 of the chipset 200 changes the system settings and configurations for operation in a Navigation mode at block 830. Specifically, the IDE control logic 620 as shown in FIG. 6 sets up the FIFO threshold level, the delay time and parameters such as "burst size", "transfer count", and "base memory address" in accordance with the Navigation mode.

The operating system (OS) of the mobile PC 100 then detects the Navigation mode entry and changes OS settings and configurations for operation in the Navigation mode at block 840. After the OS settings and configurations are adjusted for operation in the Navigation mode, the mobile PC 100 operates in a Navigation mode at block 850.

When there is a break from a Navigation mode at block 860, that is when there is a connection with a known access point (AP) in a Bluetooth™ system, a loss of GPS satellite lock or no change in GPS position as identified from the position sensor 230, the HDD control logic 240 of the chipset 200 changes the system settings and configurations for operation back in a normal (stationary) mode at block 870. Specifically, the IDE control logic 620 as shown in FIG. 6 sets up the FIFO threshold level, the delay time and parameters such as "burst size", "transfer count", and "base memory address" in accordance with the normal (stationary) mode.

The operating system (OS) of the mobile PC 100 then detects the Navigation mode exit and changes OS settings and configurations for operation back in the normal (stationary) mode at block 880. After the OS settings and configurations are adjusted for operation in the normal (stationary) mode, the mobile PC 100 operates in a normal mode at block 810.

Alternatively, current ACPI power management specification may also be modified or extended to provide smooth transitions into or out of the Navigation from applicable ACPI states. For example, the Navigation mode can be defined as being a subset of global systems states (Gx states). According ACPI power management specification, the hard disk drive "HDD" 250 and other storage devices 260A–260N can be represented by device performance states (Px states) including P0–Pn where P0 indicates the HDD 250 is using its maximum performance capability and may consume maximum power and Pn indicates the HDD 250 is at its minimum level and consumes minimal power while remaining in an active state. While the HDD 250 is in Px state during a Navigation mode (where "x" not equal to "0"), the HDD 250 will consume less power than usual and also less susceptible to failure from unexpected mechanical shock. The HDD control logic 240 of the host chip 200 may still be utilized as described with reference to FIGS. 3 and 4 in order to control the timing (delay and burst size) of hard disk accesses (reads and writes) in the Navigation mode.

As described in the foregoing, the present invention advantageously provides a mechanism for identifying and differentiating between the stationary and mobile (dynamic) operating environments of the mobile PC in order to optimize mobile PC system performance and power management for mobile applications, while taking into account certain operating environments typical of such mobile applications and reducing the risk of damage to system components. The Navigation mode provides a safe (for the mobile PC) way to use the mobile PC while it is in motion while optimizing power and performance for mobile applications at the same time.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the computer system as shown in FIGS. 1–2 may be configured differently or employ some or different components than those illustrated. In addition, the HDD control logic shown in FIG. 6 may be configured differently or employ some or different components than those illustrated without changing the basic function of the invention. Further, operating system (OS) and ACPI control methods may be designed to perform the same task as shown in FIGS. 3–8. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A mobile system, comprising:
   a storage device;
   a vibration sensor arranged to detect whether there is a presence of sustained or sporadic mechanical vibrations over a designated time duration, and to generate therefrom a vibration signal indicating the presence of sustained or sporadic mechanical vibrations;
   a chipset having a storage controller arranged to control accesses to said storage device, including limiting accesses to said storage device to minimize damage to said storage device in response to the vibration signal indicating the presence of sustained or sporadic mechanical vibrations; and
   a position sensor arranged to detect whether there is a change in the position of said mobile system at a fixed or variable velocity or acceleration, and to generate a position signal indicating the change in the position of said mobile system.

2. The mobile system as claimed in claim 1, wherein said storage controller of said chipset further limits accesses to said storage device to minimize damage to said storage device in response to the position signal indicating the change in the position of said mobile system.

3. The mobile system as claimed in claim 2, wherein said storage device corresponds to a hard disk drive.

4. The mobile system as claimed in claim 3, wherein said storage controller contains registers for the following purposes: (1) set timing (delay, burst size) to control frequency of read/write cycles; (2) set burst size to control how much data is transferred during each read/write cycle; and (3) completely block hard disk access (read or write) if the vibration signal indicates the presence of strong sustained vibrations for short periods of time.

5. The mobile system as claimed in claim 3, wherein said storage controller comprises:
   control registers arranged to set parameters for individual transfers (read or write) based on the vibration signal from said vibration sensor or the position signal from said position sensor regardless whether said mobile system is operating in a normal (stationary) mode or a mobile (Navigation) mode, wherein said parameters include a burst size, a transfer count, and a base memory address;
   first-in/first-out (FIFO) devices arranged to provide line buffering required for data transfers to said storage device; and
   control logic arranged to set up the FIFO threshold level of the FIFO devices and the delay time, via the control registers in order to write/read data to/from said storage device.

6. The mobile system as claimed in claim 5, wherein said control logic initiates writing data to said storage device, waits until the delay time is completed and the FIFO threshold level is reached before data can be written onto said storage device.

7. The mobile system as claimed in claim 3, wherein said position sensor is implemented with communication devices according to Bluetooth specification or Global Position System (GPS) standards.

8. The mobile system as claimed in claim 7, wherein said position sensor is used to trigger the mobile system to operate in a Navigation mode when the mobile system is out of position or disconnected from an Access Point operating according to Bluetooth specification, and exit from the Navigation mode when the mobile system is stationary or connected with said Access Point.

9. A computer system, comprising:
   a disk drive;
   a host processor equipped with an operating system (OS) which enables operation in a normal mode when the computer system is stationary and a Navigation mode when the computer system is mobile;
   a vibration sensor arranged to detect whether there is a presence of sustained or sporadic mechanical vibrations over a designated time duration, and to generate therefrom a vibration signal indicating the presence of sustained or sporadic mechanical vibrations;
   a position sensor arranged to detect whether there is a change in the position of the computer system at a fixed or variable velocity or acceleration, and to generate a position signal indicating the change in the position of the computer system; and a chipset equipped with a disk drive control logic ranged to control disk accesses to said disk drive, including controlling disk accesses to said disk drive in order to reduce damages to said disk drive in response to the vibration signal indicating the presence of sustained or sporadic mechanical vibrations or the position signal indicating the change in the position of the computer system.

10. The computer system as claimed in claim 9, further comprising:
    a flash memory connected to the chipset, to store a set of system basic input/output start up (BIOS) instructions at startup, and ACPI instructions implemented to provide various power saving functions, manage the progress of power saving between full-on, standby, and sleep mode, and to provide transitions between the normal mode when the computer system is stationary and the Navigation mode when the computer system is mobile from applicable ACPI states.

11. The computer system as claimed in claim 10, wherein said disk drive control logic contains registers for the following purposes: (1) set timing (delay, burst size) to control frequency of read/write cycles; (2) set burst size to control how much data is transferred during each read/write cycle; and (3) completely block hard disk access (read or write) if the vibration signal indicates the presence of strong sustained vibrations for short periods of time.

12. The computer system as claimed in claim 10, wherein said disk drive control logic comprises:
    control registers arranged to set parameters for individual transfers (read or write) based on the vibration signal from said vibration sensor or the position signal from said position sensor regardless whether said mobile system is operating in a normal (stationary) mode or a mobile (Navigation) mode, wherein said parameters include a burst size, a transfer count, and a base memory address;
    first-in/first-out (FIFO) devices arranged to provide line buffering required for data transfers to said disk drive; and
    control logic arranged to set up a FIFO threshold level of the FIFO devices and a delay time, via the control registers in order to write/read data to/from said disk drive.

13. The computer system as claimed in claim 12, wherein said control logic initiates writing data to said disk drive, waits until the delay time is completed and the FIFO threshold level is reached before data can be written onto said disk drive.

14. The computer system as claimed in claim 9, wherein said position sensor is implemented with communication devices according to Bluetooth specification or Global Position System (GPS) standards.

15. The computer system as claimed in claim 9, wherein said position sensor is used to trigger the mobile system to operate in a Navigation mode when the mobile system is out of position or disconnected from an Access Point, operating according to Bluetooth specification and exit from the Navigation mode when the mobile system is stationary or connected with said Access Point.

16. The computer system as claimed in claim 9, wherein, when the Navigation mode is triggered in response to the vibration signal or the position signal, said disk drive control logic of the chipset changes system settings and configurations for operation in the Navigation mode, and said operating system (OS) ten detects the changed system setting for Navigation mode and changes OS settings and configurations for operation in the Navigation mode.

17. The computer system as claimed in claim 16, wherein, when there is a break from the Navigation mode, said disk drive control logic of the chipset changes system settings and configuration for operation in the normal stationary mode, and said operating system (OS) then detects the exit from the Navigation mode and changes OS settings and configurations for operation in the normal stationary mode.

18. A method for enabling a mobile PC having an operating system (OS) and a chipset configured to transition between a normal (stationary) mode and a Navigation (mobile) mode, comprising:
receiving an indication from a vibration sensor or a position sensor attached to the chipset, which requests operation in a Navigation (mobile) mode when there is a presence of sustained or sporadic mechanical vibrations over a designated dine duration or when there is a change in the position of the mobile PC at a fixed or variable velocity or acceleration;

changing, at the chipset, system settings and configurations for the mobile PC to operate in the Navigation (mobile) mode;

detecting, at the operating system (OS), the changed system setting for Navigation (mobile) mode and changing OS settings and configurations for the mobile PC to operate in the Navigation (mobile) mode;

determining whether there is a break from the Navigation (mobile) mode;

changing, at the chipset, system settings and configurations for the mobile PC to operate in back in the normal (stationary) mode, when there is a break from the Navigation (mobile) mode; and detecting, at the operating system (OS), the Navigation mode exit and changing OS settings and configurations for the mobile PC to operate in the normal (stationary) mode.

19. The method as claimed in claim 18, wherein said system settings and configurations for the mobile PC to operate in the Navigation (mobile) mode include setting parameters for individual transfers (read or write) based on the indication from said vibration sensor or said position sensor, in which said parameters include a burst size, a transfer count, and a base memory address; and setting up a threshold level of FIFO devices and the delay time in order to initiate writing data to said disk drive, wait until the delay time is completed and the FIFO threshold level is reached before data is written onto said disk drive.

* * * * *